United States Patent [19]

Hedén

[11] 4,407,267
[45] Oct. 4, 1983

[54] METHOD OF REGULATING RADIATION THROUGH WINDOWS

[76] Inventor: Carl G. Hedén, Solna Kyrkväg 11, S-17164 Solna, Sweden

[21] Appl. No.: 281,705

[22] Filed: Jul. 9, 1981

[30] Foreign Application Priority Data

Jul. 14, 1980 [SE] Sweden .............................. 8005141

[51] Int. Cl.³ .............................................. F24J 3/02
[52] U.S. Cl. ..................... 126/419; 126/429; 126/450; 52/171; 160/41
[58] Field of Search ............... 126/419, 422, 450, 429, 126/431; 160/41, 120; 52/171, 173; 47/7

[56] References Cited

U.S. PATENT DOCUMENTS

| | | | |
|---|---|---|---|
| 3,903,665 | 9/1975 | Harrison | 52/171 |
| 4,151,871 | 5/1979 | Ryan | 160/120 |
| 4,231,202 | 11/1980 | Dube | 52/171 |
| 4,305,235 | 12/1981 | Roston | 52/171 |
| 4,353,353 | 10/1982 | Keller | 126/438 |

FOREIGN PATENT DOCUMENTS 744104  6/1980  U.S.S.R. ............... 160/41

*Primary Examiner*—James C. Yeung
*Attorney, Agent, or Firm*—Young & Thompson

[57] ABSTRACT

A method of insulating windows, glass walls and glazed doors whereby a porous insulating material such as small bodies or particles is caused to fill the major portion of the slot-shaped space between two transparent media where they are held between two sheets or limiting layers which can be folded at least horizontally and which, when pulled up out of the gap, transfer the insulating material to a magazine in the upper portion of the construction.

5 Claims, 1 Drawing Figure

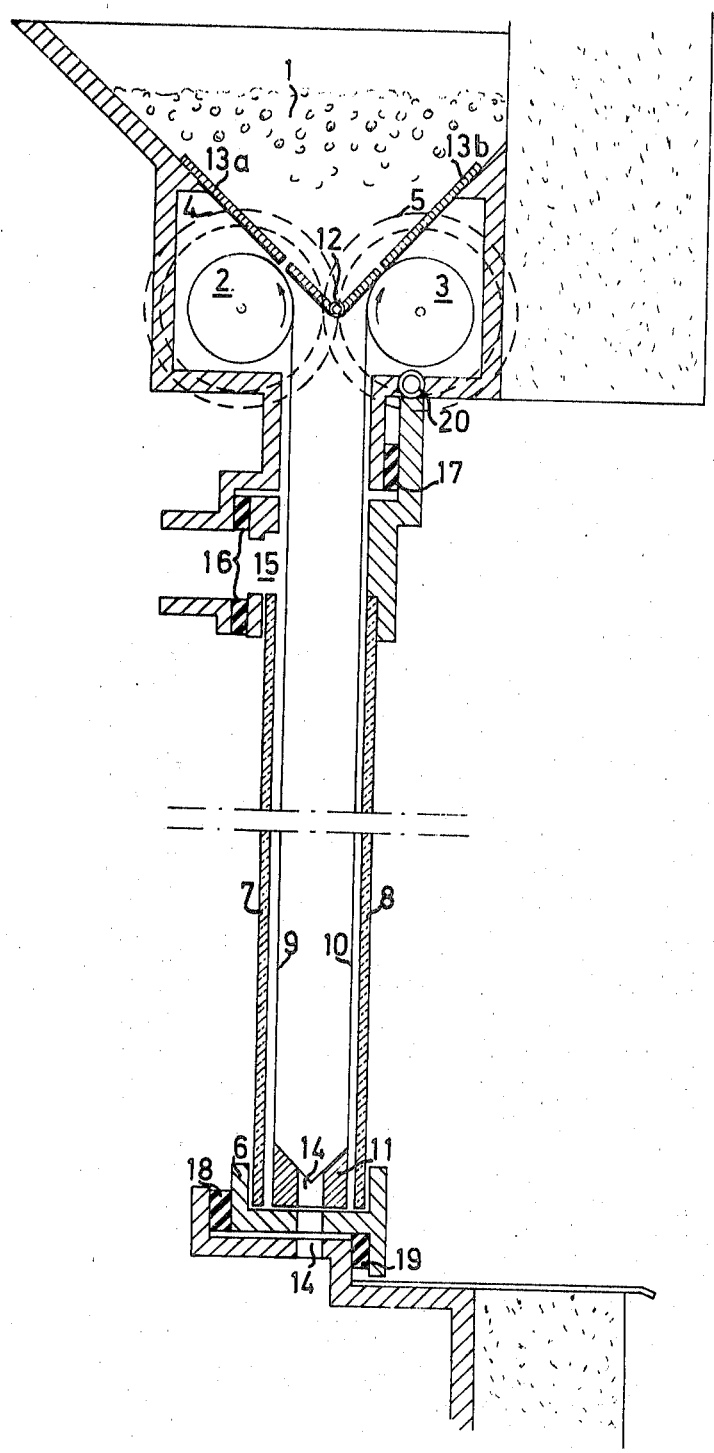

METHOD OF REGULATING RADIATION THROUGH WINDOWS

One of the major sources of heat loss from buildings is the night-time loss through windows and glazed doors. On the other hand, at the same time the windows on the south side of a building can function during the day as a valuable solar collector, and promising tests have been done with so-called "Clear view" windows where the heat collected in a Venetian blind or transparent absorber is extracted by an airflow which is allowed to pass between the panes in a double window to a suitable accumulator.

Heat losses, especially at night, can be reduced by increasing the insulation capacity by delimiting one or more relatively thin layers of air between the transparent media of the window. It is also possible with the aid of selective coatings to filter out certain portions of the spectrum of incident light, thus affecting the heating of the building. In order to combine a high insulation capacity at night with an effective heat absorption during the day, it is however necessary to use totally reflecting sheets or blinds, and/or highly insulating layers of a porous plastic material which are either used as window covers or in the form of small plastic bodies introduced, or removed from the space between two panes of glass in a window by a fan system. This operation requires however relatively labour-intensive or complicated devices, and it also limits the freedom of the architect to select openable windows. Light plastic bodies or other insulating particles have a troublesome tendency to become charged with static electricity, with expensive measures being necessary to guarantee complete removal from the glass surfaces.

The heat balance problems discussed above are most acute in regard to greenhouses where it is also necessary to be able to screen off a portion of the light when the sunlight is most intense. This is done either with the aid of some form of movable screens or with the aid of white-washing, which then has the disadvantage of limiting the relatively weak morning and evening sunlight. For achieving good insulation, as a rule several layers of glass or plastic are used, or a foam layer is generated between a pair of transparent media of glass or plastic.

The present invention is especially designed to reduce heating costs for greenhouses, but it can also be used as a simply operated shutter for ordinary buildings.

The invention relates to a method of insulating windows, glass walls and glazed doors, which is characterized in that a porous insulating material in the form of small bodies or particles is caused to fill the major portion of the slot-shaped space between two of the transparent media in the construction, where they are contained between two sheets or limiting layers which are foldable at least horizontally and which, when they are pulled up out of said gap, transfer the insulating material to a magazine in the upper portion of the construction.

The invention is described below with reference to the embodiment shown in the FIGURE.

This FIGURE represents a vertical section through a window in which the insulating material consists of pea-sized porous plastic particles kept in a magazine 1 which is connected to the upper portion of the window frame. It also provides a place for two rollers 2,3 the movements of which are coordinated with the aid of the indicated gears 4,5 or another arrangement which causes the gear wheels to rotate in the direction of the arrows, or in the opposite directions, when a switch (not shown), controlled by a temperature/light sensor, provides a start impulse to a suitable drive means. The sides and under piece of the sash are made as U-profiles 6 which surround the panes of glass 7 and 8 as well as two sheets 9,10 which are fastened at their upper edges to the rollers 2 and 3 and along their lower edges to the cross piece 11. When the rollers rotate in the direction of the arrows, the cross piece is raised and with it the insulating material which fills the space between the two sheets. The insulating material presses together a gate valve which consists of two long slats which move about the shaft 12. Thus the material can fill the magazine 1 where it is however prevented from penetrating down behind the rollers 2,3 by the two movable deflector plates 13a and 13b. Said gate valve can, when the rollers rotate in the direction opposite to that indicated by the arrows in the FIGURE, either be left in the position shown, whereby only the sheets will be lowered into the window, or the two slats can be brought together, whereby insulating material will fill the space in the window.

The sheets can be made of various materials, but for greenhouse applications a sheet is preferably chosen which is totally reflective on the side facing the inside of the greenhouse to amplify the effect of any supplementary artificial lighting. Its outside is, on the other hand, totally absorbent so that hot air can be produced between the two sheets of which the outer one is transparent and perforated with small holes slightly smaller than the plastic particles. Air which reaches the space via the holes 14 in the frame and sash can thereby be heated and then pass into a suitable heat accumulator via the opening 15. The holes 14 are not in lateral alignment, so there is only free passage when the cross piece 11 is not in its bottom position.

The window shown can be opened by virtue of the fact that it is provided with rubber weather stripping 16,17,18 and 19 and the hinge 20. Motor operation and electronic control are also possible. It is however obvious that such arrangements can be replaced or supplemented with manually operated aids, for example in the form of cranks, chains or ropes. In more simple embodiments it is, of course, not necessary that the magazine be placed in the window frame; rather it can be arranged in a suitably dimensioned sash, which can be made in many different ways to satisfy different requirements. A further improved insulation effect can be achieved by holding one or both of the sheets at a certain distance from the adjacent panes of glass. This can be simply achieved by the U-profiles in the sides of the window being provided with grooves or heels which provide support for thin but strong horizontal rods of wood or metal, for example. Through spaced attachment to the corresponding sheet, the required stiffness is achieved. It is of course possible to select sheets of widely varying materials and designs, for example textile fabrics for the inner layer in insulating windows for dwellings.

The degree of insulation which can be achieved by the invention is quite considerable and can actually provide a window with the same overall coefficient of heat transfer as a good wall. This is especially important in greenhouses in which one can expect single-glazing to provide a k-value of 5 and double-glazing a k-value of 2.5. If a 5 cm thick layer of highly insulating plastic particles, enclosed between reflecting sheets, is inserted between the two panes of glass, a k-value of less than 0.35 is achieved.

For use in greenhouses, the invention can be utilized in the following manner, for example:

The north side is made as a heavy heat-accumulating wall with vertical air ducts. The east and west sides are provided with double glass enclosing two totally reflecting sheets which, together with the insulating material, are only lowered when the light radiation is below a certain predetermined value. The south side is provided with the solar collector arrangement illustrated in the FIGURE. At night, from the outside the white color of the insulation material is visible through the frosted outer sheet. In the morning, the sheets are rolled up completely so as to fully exploit the light. As the radiation increases and the temperature rises, the two membranes (sheets) are lowered without insulation into the window, where they function as continuously variable solar collectors for hot air. The air is moved by a fan through ducts in the heat-accumulating north wall. In the evening, the gates 12 are opened at the same time as the sheets with insulating material are lowered in the east and west walls. All of the window walls are thus provided with effective insulating layers.

What I claim is:

1. A method of regulating radiation through double-glazed closures comprising a pair of spaced parallel transparent panes, comprising lowering between the panes a bag of small discrete bodies of porous insulating material with the bag extending at least most of the height of the panes, when it is desired to decrease radiation through the closure, and raising said bag from between the panes when it is desired to increase radiation through the closure.

2. A method as claimed in claim 1, and providing said bag in the form of two sheets of flexible material, and rolling up said two sheets to raise said bag and unrolling said two sheets to lower said bag.

3. A method as claimed in claim 2, and discharging said discrete particles fom the top of the bag as said sheets are rolled up, collecting said discharged particles in hopper means, and filling said bag from said hopper means when said sheets are unrolled to lower the bag.

4. A method as claimed in claim 1, and weighting the bottom of the bag with a solid horizontal member.

5. A method as claimed in claim 1, in which said sheets are transparent.

* * * * *